(12) United States Patent
Hutchinson et al.

(10) Patent No.: US 11,859,108 B2
(45) Date of Patent: Jan. 2, 2024

(54) FINISHING MEDIUMS AND FINISHING SUSPENSIONS

(71) Applicant: PostProcess Technologies, Inc., Buffalo, NY (US)

(72) Inventors: Daniel Joshua Hutchinson, Orchard Park, NY (US); Marc Farfaglia, Buffalo, NY (US); Cassidy Grant, Buffalo, NY (US)

(73) Assignee: PostProcess Technologies, Inc., Buffalo, NY (US)

( * ) Notice: Subject to any disclaimer, the term of this patent is extended or adjusted under 35 U.S.C. 154(b) by 0 days.

(21) Appl. No.: 17/856,616

(22) Filed: Jul. 1, 2022

(65) Prior Publication Data
US 2022/0340779 A1   Oct. 27, 2022

Related U.S. Application Data (62) Division of application No. 16/390,988, filed on Apr. 22, 2019, now abandoned.

(60) Provisional application No. 62/660,740, filed on Apr. 20, 2018.

(51) Int. Cl.
| | | |
|---|---|---|
| C09G 1/02 | (2006.01) | |
| B24C 1/08 | (2006.01) | |
| B33Y 40/20 | (2020.01) | |
| B33Y 40/00 | (2020.01) | |

(52) U.S. Cl.
CPC ............... *C09G 1/02* (2013.01); *B24C 1/083* (2013.01); *B33Y 40/00* (2014.12); *B33Y 40/20* (2020.01)

(58) Field of Classification Search
None
See application file for complete search history.

(56) References Cited

U.S. PATENT DOCUMENTS

| | | | |
|---|---|---|---|
| 5,322,532 A | 6/1994 | Kurtz | |
| 5,476,411 A * | 12/1995 | Held, III | C09K 3/1463 451/39 |
| 5,690,539 A * | 11/1997 | Swidler | B24C 11/005 451/39 |
| 5,750,482 A | 5/1998 | Cummings | |
| 8,394,751 B2 | 3/2013 | Hawes, III et al. | |
| 8,765,045 B2 * | 7/2014 | Zinniel | B33Y 40/20 264/341 |
| 9,039,491 B2 * | 5/2015 | Kobayashi | B24C 9/00 451/89 |

(Continued)

FOREIGN PATENT DOCUMENTS

| | | |
|---|---|---|
| CN | 106675875 A | 5/2017 |
| JP | 2001303095 A | 10/2001 |

(Continued)

*Primary Examiner* — Stephanie P Duclair
(74) *Attorney, Agent, or Firm* — Lempia Summerfield Katz LLC (57) ABSTRACT

Described are finishing mediums for removing support material and/or for surface finishing of objects made via additive manufacturing techniques. The finishing medium is an aqueous solution containing 1-20% by weight a polyol, 1-20% by weight an anti-corrosion agent, 0.001-10% by weight a hydrotrope. The finishing medium may optionally suspend media particles, thereby forming a finishing suspension. Also described are methods of using the finishing media and finishing suspensions described herein.

19 Claims, 3 Drawing Sheets

(56) References Cited

U.S. PATENT DOCUMENTS

| | | |
|---|---|---|
| 2002/0108640 A1 | 8/2002 | Barger et al. |
| 2004/0261194 A1 | 12/2004 | Price et al. |
| 2006/0194706 A1 | 8/2006 | Tijanic et al. |
| 2011/0186081 A1 | 8/2011 | Dunn et al. |
| 2012/0066851 A1* | 3/2012 | Gonzales ............. C11D 3/3951 15/104.93 |
| 2012/0066854 A1 | 3/2012 | Hettes |
| 2013/0330470 A1 | 12/2013 | Gersch et al. |
| 2015/0209836 A1 | 7/2015 | Dunn et al. |
| 2015/0252302 A1* | 9/2015 | Rieth .................... A61Q 19/00 8/405 |
| 2016/0082695 A1 | 3/2016 | Swartz et al. |

FOREIGN PATENT DOCUMENTS

| | | | |
|---|---|---|---|
| JP | 2003531759 A | | 10/2003 |
| JP | 2008530279 A | | 8/2008 |
| JP | 2014083744 | * | 5/2014 |
| WO | 02/092751 A2 | | 11/2002 |
| WO | 2017/180159 A1 | | 10/2017 |

* cited by examiner

FINISHING MEDIUMS AND FINISHING SUSPENSIONS

CROSS REFERENCE TO RELATED APPLICATIONS

This application is a divisional of U.S. Ser. No. 16/390,988 and claims the benefit of U.S. Provisional Application No. 62/660,740 filed on Apr. 20, 2018, the disclosure of which is hereby incorporated by reference.

FIELD OF THE DISCLOSURE

This application relates generally to finishing mediums for removing support material and/or for surface finishing of objects made via additive manufacturing techniques ("AMT"). Some additive manufacturing techniques are commonly referred to as "3D-printing." Such 3D-printing techniques include Polyjet, fused deposition modeling (FDM), selective laser sintering (SLS), stereolithography (SLA), multi jet fusion (MJF), direct metal laser sintering (DMLS), binder jetting, and others.

BACKGROUND OF THE DISCLOSURE

AMT processes are normally carried out by a computer-controlled device (e.g., a printer) that creates an object (an "AMT Object") by sequentially applying material. That is, an AMT Object is "printed," for example, using an inkjet printer head that additively deposits material in such a way that the AMT Object is created (printed) from a starting platform (a "printing tray" or a "build tray"). Often, AMT processes, including 3D-printing, commonly require additional material ("support material") to be printed for the purpose of supporting portions of the AMT Object during printing. This support material buttresses the AMT Object to prevent issues like sagging. Eventually, it may be desirable to remove some or all of the support material, for example, after printing is complete. In addition, objects created by an AMT process can have rough, unfinished surfaces. These surfaces may show the build lines, which are indicative of the manner in which material was printed during the AMT process. As used herein, unless otherwise indicated, the term "finishing" refers to removing undesirable material from an AMT Object so as to produce a finished AMT Object. Finishing can include one or more processes, including, but not limited to, removing undesirable metal powder, removing undesirable print material, removing undesirable support material and/or making rough surfaces smoother. Sometimes, as in the 3D-printing industry, finishing may be referred to as "cleaning."

Prior methods of finishing rely on techniques that require a person to apply and manage the finishing procedure, often on an object-by-object basis, which is expensive, inconsistent, and does not scale easily when production runs are larger than only a few objects. As such, there is a need for a finishing medium/suspension that reduces the amount of time and attention that is required from a person to finish an AMT Object, consistent from object-to-object, and scales with large production runs.

SUMMARY OF THE DISCLOSURE

The present disclosure describes finishing mediums and finishing suspensions for removing support material and/or for surface finishing of objects created by additive manufacturing techniques. The finishing medium may suspend media particles, and the finishing medium may flow through a machine that applies (e.g., sprays) the finishing medium to the AMT Object being finished. The combination of finishing medium and media particles may be referred to as a "finishing suspension." Using a finishing suspension that is in keeping with the invention, the primary means for finishing is mechanical and chemical in nature.

A finishing medium that is in keeping with the invention may be combined with one or more media particles, thereby forming a finishing suspension. Media particles may aid in providing a mechanical force to remove support material and/or a portion of the object being finished. Examples of media particles include, but are not limited to, glass beads, steel (e.g., stainless steel) particles, ceramic materials/particles, aluminum oxide particles (e.g., alumina particles), silicon oxide particles (e.g., silica particles), zirconium oxide particles (e.g., zirconia particles), zirconium particles, silicon carbide particles, plastic particles, garnet particles, copper particles, corn cob particles, walnut shells, mica particles, feldspar particles, pumice particles, and the like. A finishing medium may be combined with a single type of media particle (e.g., solely alumina, stainless steel particles, ceramic particles (e.g., silica-based particles, silicon-based particles, and the like), or the like). Alternatively, a finishing suspension may have two or more types of media particles (e.g., alumina, stainless steel particles, ceramic particles (e.g., silica-based particles, silicon-based particles, and the like), and the like, and combinations thereof) and/or media particles of different sizes (e.g., alumina and stainless steel particles, where the alumina particles all have the same average size and the stainless steel particles have a different average size, or alumina where the alumina particles are various sizes). Such media particles can have a longest linear dimension (e.g., a diameter or radius) of 0.1-1000 μm, including all 0.1 μm values and ranges therebetween (e.g., 1-700 μm or 1-500 μm). The media particles may be of various shapes, such as, for example, round, oblong, irregular, jagged, angular, cubic, rectangular, and cylindrical. Media particles of one shape may be used with media particles of a different shape (e.g., round particles may be used with jagged particles). Media particles may be used to abrade and/or polish the AMT Object. The abrasion and/or polishing effect may be dependent on the shape and size of the media particles and the application pressure. For example, 1 to 100 pounds of media particles, including all 0.1 pound values and ranges therebetween, can be added for every 25 to 30 gallons of finishing medium, including every 0.1 gallon value and range therebetween. Thus, the ratio of pounds of media particles to gallons of finishing medium may be 1:30 to 4:1, including all integer ratio values and ranges therebetween. In various other examples, a finishing suspension comprises 1 to 2 pounds of media particles per gallon of finishing medium, including every 0.01 pound value and range therebetween.

The present disclosure describes a finishing medium having:
  1-20% by weight a polyol;
  optionally, 1-20% by weight an anti-corrosion agent;
  0.001-10% by weight a hydrotrope; and
  the remainder is water.
A polyol of the finishing medium may be chosen from ethylene glycol, propylene glycol, glycerol, methoxytriglycol, ethoxytriglycol, butoxytriglycol, diethylene glycol n-butyl 30 ether acetate, diethylene glycol monobutyl ether, ethylene glycol n-butyl ether acetate, ethylene glycol monobutyl ether, diethylene glycol monoethyl ether, ethylene glycol phenyl ether, diethylene glycol monohexyl ether, ethylene glycol monohexyl ether, diethylene glycol monomethyl ether, ethylene glycol monopropyl ether, di(propylene glycol) methyl ether, dipropylene glycol methyl ether acetate, dipropylene glycol n-butyl ether, propylene glycol diacetate, propylene glycol methyl ether, propylene glycol monomethyl ether acetate, propylene glycol n-butyl ether, propylene glycol phenyl ether, tripropylene glycol methyl ether, tripropylene glycol n-butyl ether, dipropylene glycol dimethyl ether, 2-butoxyethanol, and the like, and combinations thereof. An anti-corrosion agent of the finishing medium may be chosen from organooxygen compounds, organoamine compounds, organosulfur compounds, organophosphorus compounds, and combinations thereof. Examples of anti-corrosion agents include, but are not limited to, ethanolamine, diethanolamine, zinc dialkyldithiophosphate, benzotriazole, dibutylamine, and combinations thereof. A hydrotrope of the finishing medium may be chosen from sodium xylene sulfonate, xylene sulfonic acid, calcium xylene sulfonate, potassium xylene sulfonate, cumene sulfonic acid, sodium cumene sulfonate, toluene sulfonic acid, sodium toluene sulfonate, and combinations thereof. The hydrotrope may be a mixture of hydrotrope isomers. The hydrotrope may be provided via an aqueous solution comprising 1-50% by weight a hydrotrope.

A finishing medium may further comprise media particles thereby forming a finishing suspension. The media particles may be chosen from aluminum-based particles, stainless steel particles, ceramic particles, and combinations thereof. The media particles may have a size of 1-1000 μm.

The finishing medium may include propylene glycol, triethanolamine, and sodium xylene sulfonate ("SXS"). The SXS may be supplied as an aqueous solution having 40% by weight SXS.

The finishing medium may have:
- 10% by weight propylene glycol;
- 10% by weight triethanolamine;
- 4% by weight an aqueous solution having 40% by weight SXS; and
- 76% by weight water, wherein the pH of the finishing medium is from 4 to 14, (e.g., a pH of 7-14 or 4-9 or 8). The media particles may be suspended in the finishing medium, thereby forming a finishing suspension.

A method of finishing an AMT Object may comprise:
(i) applying a finishing medium that is in keeping with the invention to an AMT Object such that a portion of the AMT Object is removed.

The finishing medium may be sprayed onto the AMT Object. The finishing medium may sprayed at a pressure up to 60 psi at a temperature of 50-140° F.

A finishing medium that is in keeping with the invention may have a pH from 4 to 14.

An AMT Object may be made by fused deposition modeling, selective laser sintering, stereolithography, multi-jet fusion, and/or direct metal laser sinter/binder jetting methods.

BRIEF DESCRIPTION OF THE FIGURES

For a fuller understanding of the nature and objects of the invention, reference should be made to the following detailed description taken in conjunction with the accompanying figures.

FIG. 1A shows a side of the object, and FIG. 1B shows a bottom of the object. FIG. 1C shows the side and bottom of the finished object, and FIG. 1D shows the bottom of the finished object.

FIG. 2 shows a single-axis fusillade jet (1), compressed air (2), detergent (i.e., the finishing medium) (3), suspended solids (i.e., media particles) (4), rotating t-slotted turntable (5), debris filter (6), detergent/slurry (i.e., the finishing suspension) (7), pump suction (8), and a single axis fusillade jet (9). Such a machine may be the same or similar to the apparatuses disclosed in U.S. patent application Ser. No. 16/209,778.

DETAILED DESCRIPTION OF THE DISCLOSURE

Although the invention will be described in terms of certain examples, other examples, including examples that do not provide all of the benefits and features set forth herein, are also within the scope of the invention. Various changes to the composition of a finishing medium or a finishing suspension and/or method of finishing an AMT Object may be made without departing from the scope of the invention.

Ranges of values are disclosed herein. The ranges set out a lower limit value ("LLV") and an upper limit value ("ULV"). Unless specified otherwise, the LLV, ULV, and all values between the LLV and ULV are part of the range.

The present disclosure describes finishing mediums for removing support material and for surface finishing of AMT Objects. The finishing medium suspends media particles (forming a finishing suspension) and allows the media particles to flow through a machine that applies (e.g., sprays) the finishing suspension to the AMT Object being finished. The primary means for finishing using a finishing suspension that is in keeping with the invention is mechanical and chemical in nature. That mechanical aspect may be achieved by media particles impacting the outer surface of the AMT Object and the chemical aspect may be achieved through dissolution of dissolvable portions of the AMT Object.

As used herein, unless otherwise indicated, the term "support material" refers to material that is operatively arranged to support portions of an AMT Object during an additive manufacturing process, but which is undesirable once the manufacturing process is complete. Support material can comprise the same material as the object that is being manufactured, or can be made of a different material. Materials that can be removed during finishing include, but are not limited to, materials used during Polyjet 3D-printing (e.g., SUP705, SUP706, SUP707, SUP708, and the like, and combinations thereof), fused deposition modeling (FDM) 3D-printing (e.g., SR20, SR30, SRT00, SRi 10, and the like, and combinations thereof), selective laser sintering (SLS) 3D-printing (e.g., nylon, polystyrene, steel, titanium, and the like), stereolithography (SLA) 3D-printing (e.g., photopolymers, light-activated resin, and the like), multi-jet fusion (MJF) 3D-printing (e.g., PA 12 (polyamide) and the like), DMLS, and binder jetting 3D-printing (e.g., steel, aluminum, titanium, copper, and the like, and combinations thereof), acrylonitrile butadiene styrene (ABS), and/or PLA (polylactic acid).

A finishing medium that is in keeping with the invention may be used to carry particles for removing support material and/or removing a portion of the object being finished. The combination of a finishing medium and media particles is referred to herein as a finishing suspension.

The finishing medium may comprise a polyol, an anti-corrosion agent, a hydrotrope, and water. Such a finishing medium may have a pH of 4 to 14 (e.g., 7 to 14 or 8).

The finishing medium may comprise:
(a) 1-20% by weight a polyol, including all 0.01% values and ranges therebetween;
(b) optionally, 1-20% by weight an anti-corrosion agent, including all 0.01% values and ranges therebetween;
(c) 0.001-10% by weight a hydrotrope, including all 0.0001% values and ranges therebetween; and
(d) the remainder may be water.

Such a finishing medium may have a pH of 4 to 14 (e.g., 7 to 14 or 8).

A polyol, which may serve as a lubricating agent in a finishing medium that is in keeping with the invention, may aid in coating the object being finished. Such a coating may aid in dissolving undesired support material. Examples of polyols (e.g., glycols and glycol ethers) suitable for a finishing medium that is in keeping with the invention include, but are not limited to, propylene glycol, ethylene glycol, glycerol, methoxytriglycol, ethoxytriglycol, butoxytriglycol, diethylene glycol n-butyl 30 ether acetate, diethylene glycol monobutyl ether, ethylene glycol n-butyl ether acetate, ethylene glycol monobutyl ether, diethylene glycol monoethyl ether, ethylene glycol phenyl ether, diethylene glycol monohexyl ether, ethylene glycol monohexyl ether, diethylene glycol monomethyl ether, ethylene glycol monopropyl ether, di(propylene glycol) methyl ether, dipropylene glycol methyl ether acetate, dipropylene glycol n-butyl ether, propylene glycol diacetate, propylene glycol methyl ether, propylene glycol monomethyl ether acetate, propylene glycol n-butyl ether, propylene glycol phenyl ether, tripropylene glycol methyl ether, tripropylene glycol n-butyl ether, dipropylene glycol dimethyl ether, 2-butoxyethanol, and the like, and combinations thereof. For example, a finishing medium that is in keeping with the invention may be 1-50% by weight a polyol, including all 0.01% values and ranges therebetween, relative to the total weight of the finishing medium. In an example, a finishing medium that is in keeping with the invention may be 1-20% by weight a polyol, 1-10% by weight a polyol, 10-20% by weight a polyol, or 1-15% by weight a polyol.

An anti-corrosion agent in a finishing medium that is in keeping with the invention may be included in order to keep metal components of the finishing machine and build plates from corroding. Anti-corrosion agents may be, for example, organooxygen compounds, organoamine compounds, organosulfur compounds, organophosphorus compounds, or a combination thereof. Examples of anti-corrosion agents suitable for a finishing medium that is in keeping with the invention include, but are not limited to, ethanolamine, diethanolamine, zinc dialkyldithiophosphate, benzotriazole, dibutylamine, combinations thereof, and the like. For example, a finishing medium that is in keeping with the invention may be 1-20% by weight an anti-corrosion agent, including all 0.01% values and ranges therebetween, relative to the total weight of the finishing medium.

A hydrotrope may be included in a finishing medium that is in keeping with the invention in order to aid in solubilizing organic materials (e.g., the organic components in a finishing medium and resins from the object) in water. Examples of hydrotropes suitable for a finishing medium that is in keeping with the invention include, but are not limited to, SXS, xylene sulfonic acid, calcium xylene sulfonate, potassium xylene sulfonate, cumene sulfonic acid, sodium cumene sulfonate, toluene sulfonic acid, sodium toluene sulfonate, and combinations thereof. Such hydrotropes can be added to the finishing medium as a solid or can be added to the finishing medium as an aqueous solution comprising 1-50% hydrotrope by weight, including all 1% values and ranges therebetween. Such hydrotropes can be a mixture of isomers (e.g., stereoisomers, constitutional isomers, and the like). For example, a finishing medium that is in keeping with the invention may be 0.001-10% by weight a hydrotrope, including all 0.0001% values and ranges therebetween, relative to the total weight of the finishing medium.

A finishing medium that is in keeping with the invention may be combined with one or more media particles. Herein, the combination of a finishing medium containing media particles is referred to as a finishing suspension. Media particles may aid in providing a mechanical force to remove support material and/or a portion of the object being finished. Examples of media particles include, but are not limited to, glass beads, steel (e.g., stainless steel) particles, ceramic materials/particles, aluminum oxide particles (e.g., alumina particles), silicon oxide particles (e.g., silica particles), zirconium oxide particles (e.g., zirconia particles), zirconium particles, silicon carbide particles, plastic particles, garnet particles, copper particles, corn cob particles, walnut shells, mica particles, feldspar particles, pumice particles, and the like. A finishing medium may be combined with a single type of media particles (e.g., solely alumina, stainless steel particles, ceramic particles (e.g., silica-based particles, silicon-based particles, and the like), or the like). Alternatively, a finishing suspension may have two or more types of media particles (e.g., alumina, stainless steel particles, ceramic particles (e.g., silica-based particles, silicon-based particles, and the like), and the like, and combinations thereof) and/or media particles of different sizes (e.g., alumina and stainless steel particles, where the alumina particles all have the same average size and the stainless steel particles have a different average size, or alumina where the alumina particles are various sizes). Such media particles can have a longest linear dimension (e.g., a diameter or radius) of 0.1-1000 μm, including all 0.1 μm values and ranges therebetween (e.g., 1-700 μm or 1-500 μm). The media particles may be of various shapes, such as, for example, round, oblong, irregular, jagged, angular, cubic, rectangular, and cylindrical. Media particles of one shape may be used with media particles of a different shape (e.g., round particles may be used with jagged particles). Media particles may be used to abrade and/or polish the AMT Object. The abrasion and/or polishing effect may be dependent on the shape and size of the media particles and the application pressure. For example, 1 to 100 pounds of media particles, including all 0.1 pound values and ranges therebetween, can be added for every 25 to 30 gallons of finishing medium, including every 0.1 gallon value and range therebetween. Thus, the ratio of pounds of media particles to gallons of finishing medium may be 1:30 to 4:1, including all integer ratio values and ranges therebetween. In various other examples, a finishing suspension comprises 1 to 2 pounds of media particles per gallon of finishing medium, including every 0.01 pound value and range therebetween.

In a particular example of the invention, the finishing medium can comprise:
(a) 1-20% by weight a propylene glycol, including all 0.010% values and ranges therebetween;
(b) 1-20% by weight triethanolamine, including all 0.01% values and ranges therebetween;

(c) 0.001-10% by weight SXS, including all 0.0001% values and ranges therebetween; and
(d) the remainder is water.

Such a finishing medium may have a pH of 4 to 14, including all 0.01 pH values and ranges therebetween (e.g., a pH of 7-14 or 4-9 or 8). In a particular example, a finishing suspension comprises a finishing medium comprising:
(a) 10% by weight a propylene glycol;
(b) 10% by weight triethanolamine;
(c) 4% by weight a 40% by weight aqueous solution of SXS; and
(d) the remainder is water.

Such a finishing medium may have a pH of about 8.

For example, the finishing suspension can comprise a finishing medium comprising:
(a) 1-20% by weight a propylene glycol, including all 0.01% values and ranges therebetween;
(b) 1-20% by weight triethanolamine, including all 0.01% values and ranges therebetween;
(c) 0.001-10% by weight sodium xylene sulfonate, including all 0.0001% values and ranges therebetween; and
(d) the remainder may be water, and media particles chosen from the group consisting of alumina particles, stainless steel particles, ceramic particles (e.g., silica-based particles, silicon-based particles, and the like), and combinations thereof. There may be 1 to 2 pounds of media particles for every gallon of finishing medium. Such a finishing medium/suspension may have a pH of 7 to 14, including all 0.01 pH values and ranges therebetween. In a particular example, the finishing suspension can comprise a finishing medium comprising:
(a) 10% by weight a propylene glycol;
(b) 10% by weight triethanolamine, including all 0.01% values and ranges therebetween;
(c) 4% by weight a 40% by weight aqueous solution of SXS; and
(d) the remainder is water, and media particles selected from the group consisting of alumina particles, stainless steel particles, ceramic particles, and combinations thereof. Such a finishing medium/suspension may have a pH of about 8 (e.g., a pH of 8±0.5).

A finishing medium that is in keeping with the invention may help reduce media attrition. Media attrition occurs when the media particles inside the machine applying the finishing suspension break down (e.g., mechanically fracture) into a form that is less effective or ineffective. The media particles are less effective or ineffective when the particles are too small to carry enough momentum to impart an effective force on the AMT Object for purposes of removing material from the object. Particle size changes because large particles may fracture when impacting the object and/or as a result of being pumped. With time, the average size of the particles will become smaller and thus decrease in mass, and, as such, each particle becomes less effective at removing material from the object as they become smaller.

Figure 3:
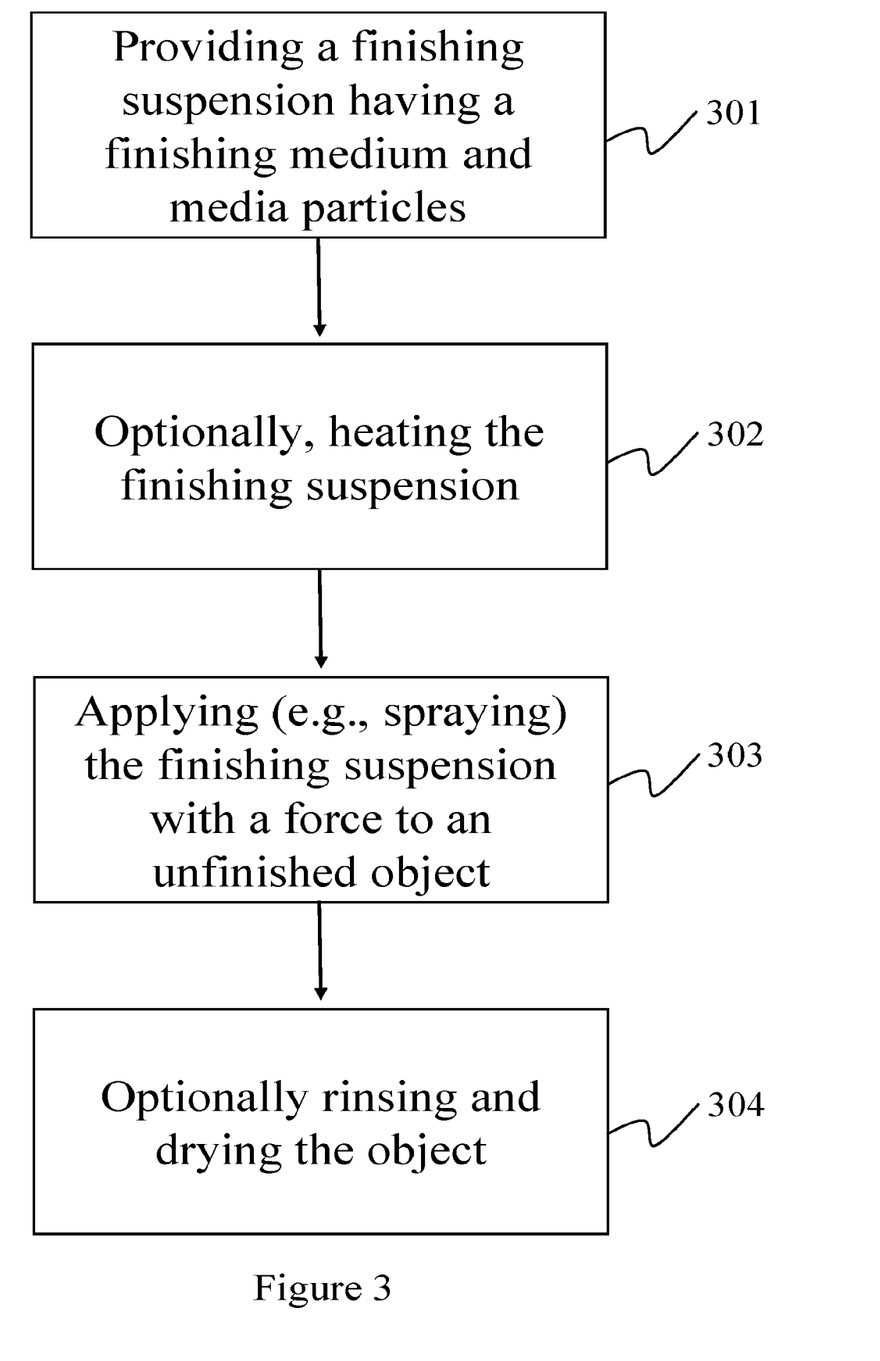
FIG. 3 is a flow diagram of a method of using a finishing suspension that is in keeping with the invention.

The invention may be embodied as a method of using a finishing medium/suspension. The steps of such a method may be sufficient to remove undesirable material (e.g., support material, undesirable print material, undesirable metal, and the like) from an AMT Object. The method may comprise:
(a) providing (301 in FIG. 3) a finishing medium/suspension that is in keeping with the invention; and
(b) applying (303 in FIG. 3) (e.g., spraying) the finishing medium/suspension to an AMT Object, such that a portion of the object is removed.

Applying the finishing medium to an AMT Object may involve spraying and/or otherwise coating the object, such that the finishing medium/suspension is applied to the object so that mechanical force is exerted on the object. To increase the speed and pressure of the finishing medium/suspension leaving the nozzle, air may be simultaneously forced through the same nozzle as the finishing medium/suspension to increase the velocity of the finishing medium/suspension leaving the nozzle. An AMT Object may be sprayed with the finishing medium/suspension at a pressure up to 60 psi (e.g., 35 psi), inclusive. Along with the finishing medium/suspension, air may be forced into the conduit carrying the finishing medium/suspension.

A finishing medium or finishing suspension that is in keeping with the invention may be heated (302 in FIG. 3) prior to or during application (e.g., spraying). The finishing medium or finishing suspension may have a temperature of 50-140° F., (e.g., 70-100° F.), including all 0.01° F. values and ranges therebetween. Following application of the finishing medium/suspension, the object may be rinsed with, for example, water (304 in FIG. 3) in order to remove the finishing medium or suspension and the AMT Object may be dried.

A finishing medium or finishing suspension that is in keeping with the invention may be applied by a machine (e.g., the PostProcess™ DECI DUO finishing unit). Such a machine may be the same or similar to the apparatuses disclosed in U.S. patent application Ser. No. 16/209,778. Such a machine may pump the finishing medium or finishing suspension through a nozzle that is directed at the object. The finishing medium or finishing suspension may be forced out of the nozzle at a high velocity. During such application (e.g., spraying), the object may be sprayed with a finishing medium or a finishing suspension (e.g., containing alumina particles, stainless steel particles, ceramic particles, or the like). The finishing medium (and media particles) impacts the outer surface of the object. The force of impact on the outer surface of the object assists in removing undesirable material (e.g., undesirable resin, undesirable print material, undesirable metal powder, undesirable support material, and the like). During application of the finishing medium or finishing suspension, the AMT Object may be rotated (e.g., rotated via a turntable) so that the AMT Object is thoroughly coated/impacted with the finishing medium and/or media particles. Generally, an initial finishing step can utilize a finishing suspension having larger media particles (e.g., larger media particles, such as, for example, aluminum oxide, silicon carbide, stainless steel, titanium) and then polished with a finishing suspension having smaller suspended particles (e.g., ceramic media particles, such as, for example, ZIRBLAST® and MICROBLAST© blasting media). In an example, larger and/or jagged particles may be used for abrading and spherical particles may be used for polishing.

Roughness average ("Ra") can be used to determine when an object is finished. A lower Ra indicates a smooth object, whereas a higher Ra indicates a rougher object. An object may be finished until the desired Ra is achieved. Ra is often measured in micro-inches. A lower roughness average indicates a smoother object.

The following Statements describe non-limiting examples in keeping with the present invention.

Statement 1. A finishing medium comprising: 1-20% by weight a polyol; optionally, 1-20% by weight an anti-corrosion agent; 0.001-10% by weight a hydrotrope; and water (e.g., the remainder of the finishing medium may be water).

Statement 2. The finishing medium according to Statement 1, where the polyol is chosen from ethylene glycol, propylene glycol, glycerol, methoxytriglycol, ethoxytriglycol, butoxytriglycol, diethylene glycol n-butyl 30 ether acetate, diethylene glycol monobutyl ether, ethylene glycol n-butyl ether acetate, ethylene glycol monobutyl ether, diethylene glycol monoethyl ether, ethylene glycol phenyl ether, diethylene glycol monohexyl ether, ethylene glycol monohexyl ether, diethylene glycol monomethyl ether, ethylene glycol monopropyl ether, di(propylene glycol) methyl ether, dipropylene glycol methyl ether acetate, dipropylene glycol n-butyl ether, propylene glycol diacetate, propylene glycol methyl ether, propylene glycol monomethyl ether acetate, propylene glycol n-butyl ether, propylene glycol phenyl ether, tripropylene glycol methyl ether, tripropylene glycol n-butyl ether, dipropylene glycol dimethyl ether, 2-butoxyethanol, and combinations thereof.

Statement 3. The finishing medium according to Statement 1 or Statement 2, where the anti-corrosion agent is chosen from one or more organooxygen compound, one or more organoamine compound, one or more organosulfur compound, one or more organosulfur compound, one or more organophosphorus compound, and combinations thereof, where non-limiting examples include ethanolamine, diethanolamine, zinc dialkyldithiophosphate, benzotriazole, dibutylamine, and combinations thereof.

Statement 4. The finishing medium according to any one of the preceding Statements, where the hydrotrope is chosen from sodium xylene sulfonate, xylene sulfonic acid, calcium xylene sulfonate, potassium xylene sulfonate, cumene sulfonic acid, sodium cumene sulfonate, toluene sulfonic acid, sodium toluene sulfonate, and combinations thereof.

Statement 5. The finishing medium according to Statement 4, where the hydrotrope is a mixture of hydrotrope isomers.

Statement 6. The finishing medium according to Statement 4 or Statement 5, where the hydrotrope is provided via an aqueous solution comprising 1-50% by weight a hydrotrope.

Statement 7. The finishing medium according to any one of the preceding Statements, where the finishing medium has a pH of 4 to 14 (e.g., 7 to 14 or 4 to 9 or 8).

Statement 8. The finishing medium according to any one of the preceding Statements, where the polyol is propylene glycol; the anti-corrosion agent is triethanolamine; and the hydrotrope is an aqueous solution comprising 40% by weight sodium xylene sulfonate.

Statement 9. The finishing medium according to any one of the preceding Statements, comprising: 10% by weight propylene glycol; 10% by weight triethanolamine; 4% by weight the aqueous solution having 40% by weight sodium xylene sulfonate; and 76% by weight water, where the finishing medium has pH of 4 to 14 (e.g., 7 to 14 or 4 to 9 or 8).

Statement 10. A finishing suspension comprising media particles and a finishing medium according to any one of the preceding Statements.

Statement 11. The finishing suspension according to Statement 10, where the media particles are chosen from glass beads, steel (e.g., stainless steel), ceramic materials, aluminum oxide/alumina, silica, zirconium, silicon carbide, plastic, garnet, copper, corn cob, walnut shells, mica, feldspar, pumice, and combinations thereof, where the media particles may be of various shapes, such as, for example, round, oblong, irregular, jagged, angular, cubic, rectangular, and cylindrical.

Statement 12. The finishing suspension according to Statement 10 or Statement 11, where the media particles have a longest linear dimension of 0.1-1000 μm (e.g., 1-700 μm or 1-500 μm).

Statement 13. A method of finishing an AMT Object comprising applying a finishing suspension according to any one of Statements 10-12 to an AMT Object such that a portion of the AMT Object is removed.

Statement 14. The method according to Statement 13, where support material or a portion thereof is removed.

Statement 15. The method according to Statement 13, where applying the finishing suspension comprises spraying the finishing suspension on the AMT Object.

Statement 16. The method according to Statement 15, where the finishing suspension is sprayed at a pressure of 0-60 psi.

Statement 17. The method according to any one of Statements 13-16, where the finishing suspension is at a temperature of 50-140° F.

Statement 18. The method according to any one of Statements 13-17, where the object is made by fused deposition modeling, selective laser sintering, stereolithography, multi-jet fusion, direct metal laser sinter/binder jetting methods, or a combination thereof.

The following example is presented to illustrate an embodiment of the invention. It is not intended to limit the scope of the invention.

Example 1

This example describes a method of using a finishing medium/suspension that is in keeping with the invention.

Figure 1A:
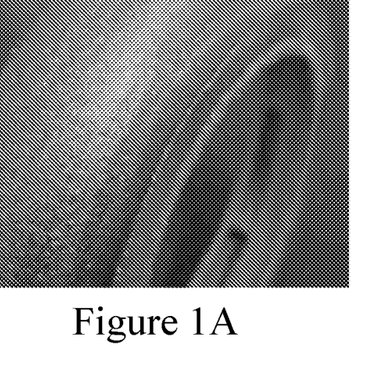
FIG. 1A and FIG. 1B are each a photo of an AMT Object made by direct metal laser sintering (DMLS) prior to finishing.
Figure 1B:
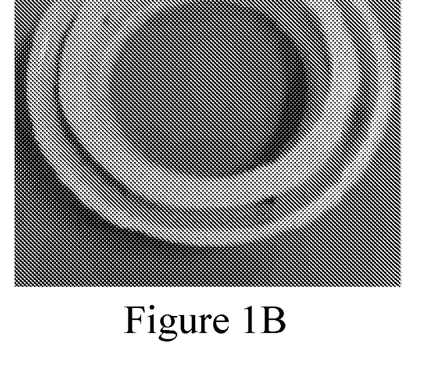
Figure 1C:
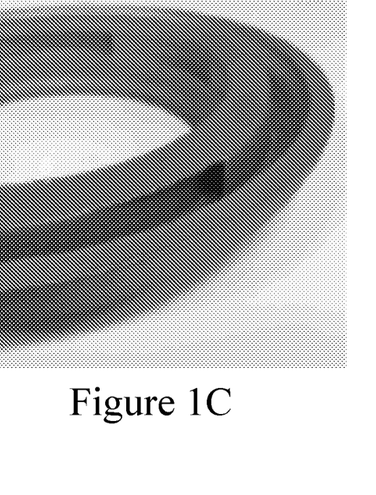
FIG. 1C and FIG. 1D are each a photo of the same AMT Object shown in FIGS. 1A and 1B after applying a finishing medium that is in keeping with the invention.
Figure 1D:
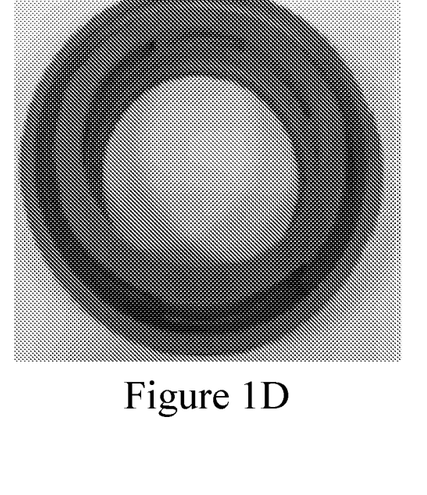
Figure 2:
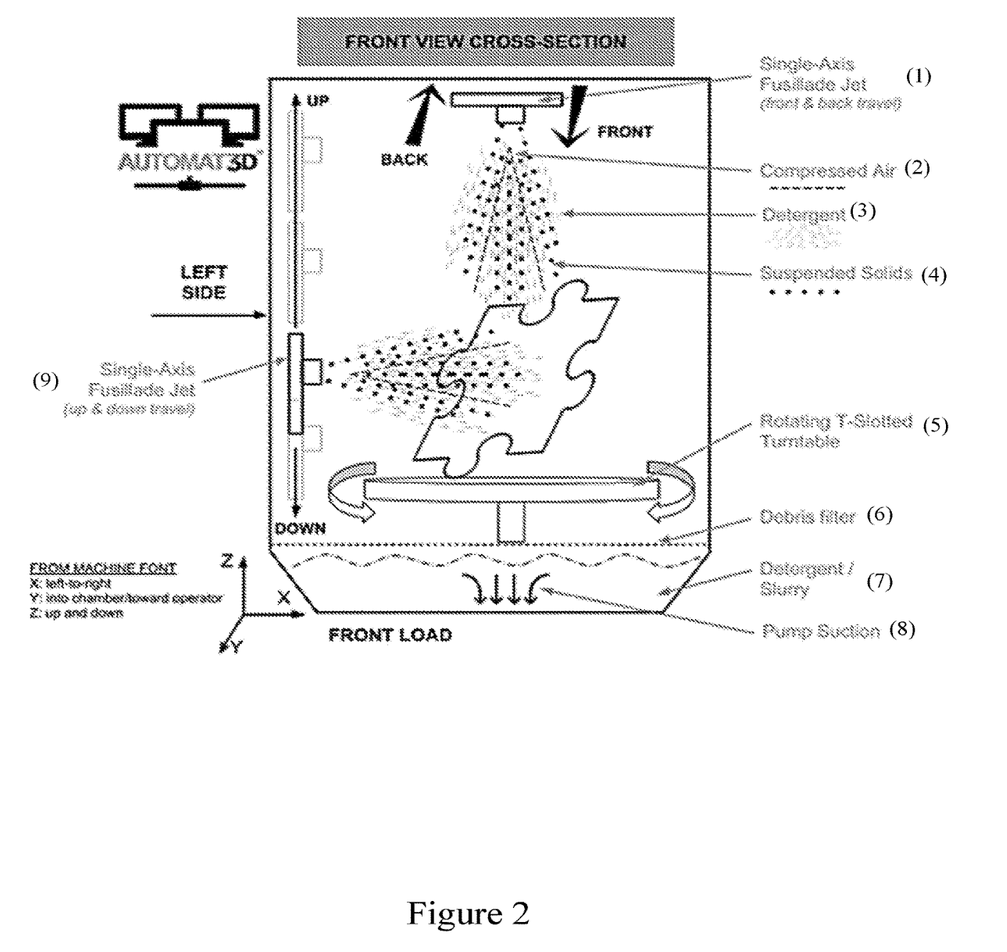
FIG. 2 is a diagram of a machine that may be used to apply a finishing medium that is in keeping with the invention.

The AMT Object in FIG. 1A and FIG. 1B was printed by a DMLS process known in the art. The object, which was made from Ti6Al4V, was finished using a finishing medium having:

(a) 10% by weight propylene glycol;
(b) 10% by weight triethanolamine;
(c) 4% by weight a 40% by weight aqueous solution of sodium xylene sulfonate; and
(d) the remainder was water.

Such a finishing medium had a pH of about 8. The finishing medium was combined with 36 grit (450 μm) aluminum oxide media particles. The resulting finishing suspension was initially heated to a temperature of about 80° F. and the AMT Object was abraded by spraying the finishing suspension at the object at a pressure of 35 psi. Air was supplied to the finishing suspension through an orifice located prior to the nozzle. Upstream of the orifice, the air pressure was 70 psi. The finishing suspension was applied (e.g., sprayed) to the object for 110 minutes while the object was on a turntable rotating at 10 rotations per minute (rpm).

The object was then polished using the finishing medium combined with ZIRBLAST® (a combination of zirconia, silica, and alumina, the majority being zirconia), having a size of 300 grit (34 m). The finishing suspension was applied to (e.g., sprayed) the object for 40 minutes while the object was on a turntable rotating at 10 rpm.

After measuring the Ra values at many locations on the unfinished AMT Object, it was determined that the high/low Ra values prior to finishing were 649/787. Following finishing, the high/low Ra values were determined to be 58/98.

It will be appreciated that various aspects of the invention and other features and functions, or alternatives thereof, may be desirably combined into many other different systems or applications. Various alternatives, modifications, variations, or improvements therein may be subsequently made by those skilled in the art, and these are also intended to be encompassed by the invention. Although embodiments of the invention have been described herein, the invention is not limited to such embodiments. Hence, the present invention is deemed only limited by the appended claims and the reasonable interpretation thereof.

The invention claimed is:

1. A method of finishing an object made from an additive manufacturing technique ("AMT Object") comprising, applying a finishing suspension to an AMT Object such that a portion of the AMT Object and/or support material or a portion thereof is removed, the finishing suspension having;
   media particles; and
   a finishing medium comprised of:
      1-20% by weight a polyol,
      0.001-10% by weight a hydrotrope, and
      water, wherein pressurized air is supplied to the finishing suspension through an orifice prior to a nozzle applying the finishing suspension to the AMT Object.

2. The method of claim 1, wherein applying the finishing suspension comprises spraying the finishing suspension at the AMT Object.

3. The method of claim 2, wherein the finishing suspension is sprayed at a pressure of 0-60 psi.

4. The method of claim 1, wherein the finishing suspension is at a temperature of 50-140° F.

5. The method of claim 1, wherein the AMT Object is made by fused deposition modeling, selective laser sintering, stereolithography, multi jet fusion, direct metal laser sinter/binder jetting methods, or a combination thereof.

6. A method of finishing an object made from an additive manufacturing technique using a machine that applies a finishing suspension to the object, the method comprising:
   pumping the finishing suspension to a nozzle of the machine;
   spraying the finishing suspension from the nozzle;
   supplying pressurized air to the finishing suspension through an orifice prior to the nozzle in the machine; and
   directing the finishing suspension from the nozzle at the object,
wherein the finishing suspension is comprised of a finishing medium and suspended solid media particles; and
wherein the finishing medium is comprised of:
   1-20% by weight a polyol;
   1-20% by weight an anti-corrosion agent;
   0.001-10% by weight a hydrotrope; and
   water.

7. The method of claim 6, wherein the finishing suspension is sprayed at a pressure of 0-60 psi.

8. The method of claim 6, wherein the finishing suspension is at a temperature of 50-140° F.

9. The method of claim 6, wherein the additive manufacturing technique by which the object is made is one of: fused deposition modeling, selective laser sintering, stereolithography, multi jet fusion, direct metal laser sinter/binder jetting methods, or a combination thereof.

10. The method of claim 6 further comprising smoothing a surface of the object.

11. The method of claim 6 further comprising removing support material from the object.

12. The method of claim 6 wherein the finishing suspension is sprayed for one of 40 minutes or 110 minutes.

13. The method of claim 6 wherein the pressurized air is at 70 psi upstream of the orifice.

14. The method of claim 6 further comprising rotating the object on a turntable in the machine.

15. The method of claim 6 wherein the finishing medium has a pH of 4 to 14.

16. The method of claim 6 wherein the polyol is chosen from ethylene glycol, propylene glycol, glycerol, methoxytriglycol, ethoxytriglycol, butoxytriglycol, diethylene glycol n-butyl 30 ether acetate, diethylene glycol monobutyl ether, ethylene glycol n-butyl ether acetate, ethylene glycol monobutyl ether, diethylene glycol monoethyl ether, ethylene glycol phenyl ether, diethylene glycol monohexyl ether, ethylene glycol monohexyl ether, diethylene glycol monomethyl ether, ethylene glycol monopropyl ether, di(propylene glycol) methyl ether, dipropylene glycol methyl ether acetate, dipropylene glycol n-butyl ether, propylene glycol diacetate, propylene glycol methyl ether, propylene glycol monomethyl ether acetate, propylene glycol n-butyl ether, propylene glycol phenyl ether, tripropylene glycol methyl ether, tripropylene glycol n-butyl ether, dipropylene glycol dimethyl ether, 2-butoxyethanol, and combinations thereof.

17. The method of claim 6 wherein the anti-corrosion agent is chosen from one or more organooxygen compound, one or more organoamine compound, one or more organosulfur compound, one or more organophosphorus compound, ethanolamine, diethanolamine, zinc dialkyldithiophosphate, benzotriazole, dibutylamine, and combinations thereof.

18. The method of claim 6 wherein the suspended solid media particles are chosen from aluminum-based particles, stainless steel particles, steel particles, ceramic particles, glass beads, aluminum oxide, silica, zirconium oxide, zirconia, zirconium, silicon carbide, plastic, garnet, copper, corn cob, walnut shells, mica, feldspar, pumice, and combinations thereof.

19. The method of claim 6 wherein the suspended solid media particles have a longest linear dimension of 1-1000 µm.

* * * * *